United States Patent [19]
Itoh et al.

[11] Patent Number: 5,648,948
[45] Date of Patent: Jul. 15, 1997

[54] APPARATUS FOR RECORDING AND REPRODUCING A FREQUENCY BANDWIDTH CODED DIGITAL AUDIO SIGNAL

[75] Inventors: Naoto Itoh; Yoshihisa Nagai; Satoru Nomura, all of Yamanashi, Japan

[73] Assignees: Pioneer Electronic Corporation, Yamanashi; Pioneer Electronic Corporation, Tokyo, both of Japan

[21] Appl. No.: 953,972

[22] Filed: Sep. 30, 1992

[30] Foreign Application Priority Data

Mar. 4, 1992 [JP] Japan ................................ 4-047136

[51] Int. Cl.$^6$ ................................................ G11B 7/00
[52] U.S. Cl. ................................ 369/48; 369/124
[58] Field of Search .......................... 369/48, 59, 89, 369/124, 32, 53-54, 58; 381/31; 395/2.1, 2.21

[56] References Cited

U.S. PATENT DOCUMENTS 5,105,412   4/1992   Yoshio ........................ 369/48
5,161,210  11/1992   Druyvesteyn et al. .......... 395/2

*Primary Examiner*—W. R. Young
*Attorney, Agent, or Firm*—Perman & Green, LLP

[57] ABSTRACT

A digital audio signal recording and reproducing system employs a recording method which can function for a reproducing apparatus of a low price satisfying the performance of the conventional standard and also an expensive reproducing apparatus of a high sound quality which satisfy the standard of the Super CD featuring a wide band, a high sound quality, and multi channels. The recording apparatus divides recording audio signals into a plurality of frequency components and produces data for recording, respectively. Further, the recording apparatus adds identification data indicative of a frequency band of each of the data and records the resultant data. The reproducing apparatus selectively extracts each of the above data by means of the identification data and performs the reproduction of the extracted data.

4 Claims, 8 Drawing Sheets

FIG. 5

| LABEL | KIND | |
|---|---|---|
| 0 0 | NULL | |
| 0 1 | SYSTEM | |
| 0 2 ~ 0 F | SPARE | |
| 1 0 | A 1 L | (AUDIO SIGNAL 1 CHANNEL LOW-BAND HIGH-ORDER 16 BITS) |
| 1 1 | A 2 L | (AUDIO SIGNAL 2 CHANNEL LOW-BAND HIGH-ORDER 16 BITS) |
| 1 2 | A 3 L | (AUDIO SIGNAL 3 CHANNEL LOW-BAND HIGH-ORDER 16 BITS) |
| 1 3 | A 4 L | (AUDIO SIGNAL 4 CHANNEL LOW-BAND HIGH-ORDER 16 BITS) |
| 1 4 | A L Q | (AUDIO SIGNAL 1-4 CHANNELS ALQ (1/4 to 4/4) LOW-BAND LOW-ORDER) |
| 1 5 | A 1 H | (AUDIO SIGNAL 1 CHANNEL HIGH-BAND 16 BITS) |
| 1 6 | A 2 H | (AUDIO SIGNAL 2 CHANNEL HIGH-BAND 16 BITS) |
| 1 7 | A 3 H | (AUDIO SIGNAL 3 CHANNEL HIGH-BAND 16 BITS) |
| 1 8 | A 4 H | (AUDIO SIGNAL 4 CHANNEL HIGH-BAND 16 BITS) |
| 1 9 ~ F F | SPARE | |

FIG. 6

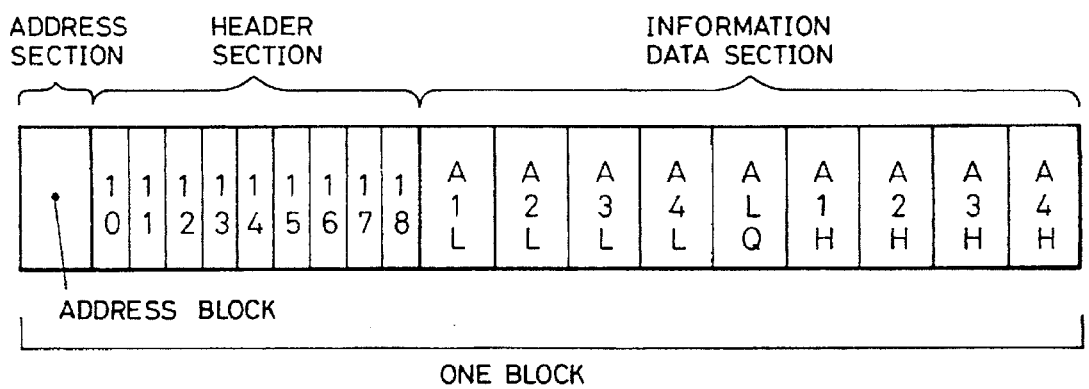

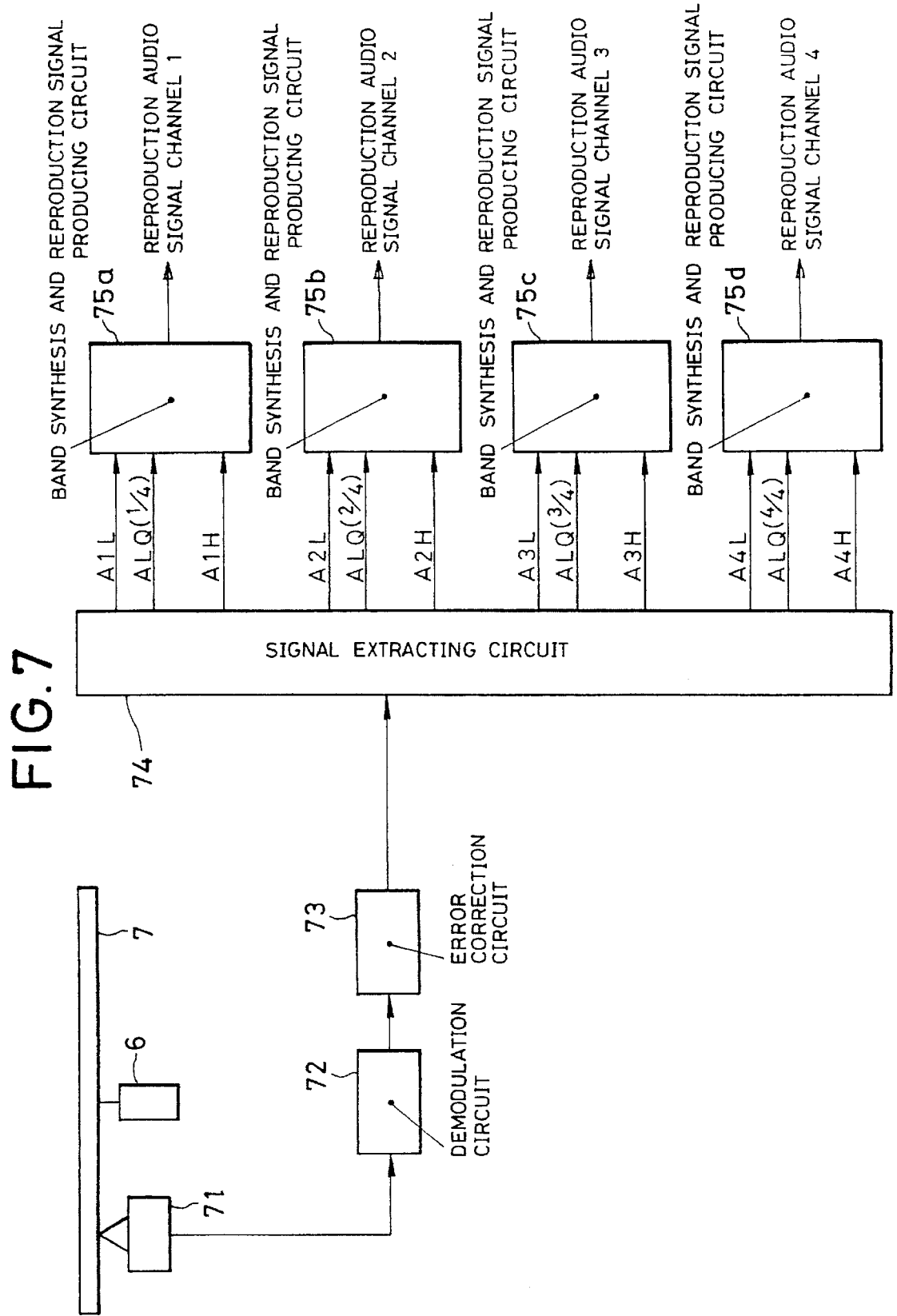

APPARATUS FOR RECORDING AND REPRODUCING A FREQUENCY BANDWIDTH CODED DIGITAL AUDIO SIGNAL

BACKGROUND OF THE INVENTION

1. Field of the Invention

The invention relates to an apparatus for recording and reproducing a digital audio signal and, more particularly, to a recording and reproducing apparatus for a digital audio disc such as a Compact Disc or the like.

2. Description of Background Information

In digital audio recording mediums such as Compact Disc (hereinafter, referred to as CD), Mini Disc (hereinafter, referred to as MD), or the like, a standard is widely used, which has a performance wherein frequency band ranges from 0 Hz to 20 kHz, the number of quantization bits is equal to 16 bits, and the audio channels are two channels.

On the other hand, it has been considered that the human ear can perceive the sound within a range from 20 Hz to 20 kHz. Therefore, the conventional CD satisfying the above performances is regarded to be satisfactory as a recording medium for audio apparatuses. However, in recent studies it is reported that the human ear has the capability of perceiving sounds having frequencies of 20 kHz and higher than 20 kHz. Accordingly, it is becoming required that the audio reproducing capability of the CD allows the reproduction of sounds having the frequency of 20 kHz or higher. When a higher sound quality is pursued, lack of sufficient dynamic range in the audio reproduction by the conventional CD is recognized, and revision of the number of quantization bits is now under consideration. Furthermore, in the current trend of audio systems, the sound field reproduction allows the production of a "presence" like that in a movie theater or a concert hall in a home listening room. To satisfy such a demand, there is proposed a method in which signals for such a sound field reproduction is also recorded on the CD in addition to the signals of two audio channels.

As a reference which satisfies such requirements, it is considered to establish a new CD standard (hereinafter, referred to as Super CD) which satisfies performance wherein the frequency response band lies within a range from 0 Hz to 40 kHz, the number of quantization bits is 20 bits, and the audio channels are four channels. A reproducing apparatus for the Super CD having above standards, however, will have a complicated circuit construction as compared with that of the apparatus designed for the conventional standard (the frequency band lies within a range from 0 Hz to 20 kHz, the number of quantization bits is 16 bits, and the audio channels are two channels), so that such a reproducing apparatus will become expensive. If the above standard of the Super CD is adopted as a general standard, it will compel users who doesn't require a high sound quality to purchase such an expensive reproducing apparatus with a high sound quality. This makes an obstacle for the generalization of the Super CD standard.

OBJECTS AND SUMMARY OF THE INVENTION

The present invention contemplates to eliminate such a problem and it is an object of the present invention to provide, as a recording and reproducing apparatus of a Super CD having a wider band, a higher sound quality, and more channels than conventional CD, a digital audio signal recording and reproducing apparatus in which there is adopted a recording method capable of operating for a reproducing apparatus whose price is reduced while satisfying the performance of a conventional standard and also for a high sound quality reproducing apparatus of a high price satisfying the standard of the Super CD.

A recording medium for digital audio signals according to the present invention is of a type in which the digital audio signals are recorded after divided into blocks, the recording medium having an information data section comprising a plurality of subblocks, and a header section arranged at the position preceding the information data section, and including a plurality of identification data blocks each indicating a frequency band at least corresponding to the respective subblocks.

A recording apparatus for digital audio signals according to the invention comprises converting means for converting input digital audio signals into groups of band digital data for each frequency band, subblock producing means for dividing each of the band digital data groups along a time base, thereby obtaining band subblocks, information data section producing means for combining the band subblocks in a same time zone among the band subblocks, thereby obtaining an information data section; header section producing means for producing a header section including identification data blocks indicative of the frequency band of each subblock included in the information data section; block producing means for combining the information data section and the header section, thereby producing a block; and recording means for recording the block on a recording medium.

A digital audio signal reproducing apparatus according to the invention is designed for reproducing information from a recording medium on which digital audio signals are recorded after divided being into blocks each of which in constituted by an information data section consisting of a plurality of subblocks and a header section which is arranged at a position preceding the information data section and includes a plurality of identification data blocks indicative of at least the frequency band corresponding to the respective subblocks, wherein the reproducing apparatus comprises: reading means for reading the digital audio signal from the recording medium; and extracting means for obtaining identification data in the header section for each block from the digital audio signal which is generated by the reading means and for extracting the digital audio signals on a subblock unit basis in accordance with the identification data when the identification data is equal to a predetermined identification data, thereby obtaining a reproduction signal.

A digital audio signal reproducing apparatus according to the invention is designed for reproducing information from a recording medium on which digital audio signals are recorded after being divided into blocks each of which in constituted by an information data section consisting of a plurality of subblocks and a header section which is arranged at the position preceding the information data section and includes a plurality of identification data blocks indicative of at least the frequency band corresponding to the respective subblocks, wherein the reproducing apparatus comprises: reading means for reading a digital signal from the recording medium; extracting means for obtaining identification data in the header section for each block from the digital signal which is generated by the reading means and for extracting the digital audio signals on a subblock unit basis in accordance with the identification data in the header section when the identification data is equal to predetermined identification data; and band synthesizing means for performing a band synthesizing operation to a selected ones of plurality of digital audio signals among the digital audio signals extracted by the extracting means, thereby obtaining reproduction signals.

By the above construction, the recording apparatus of digital audio signals according to the invention is configured to produce data from recording audio signals for each of plurality of frequency components and records the respective data and, add the identification data indicative of the frequency band of each data and records the resultant data. The digital audio signal reproducing apparatus according to the invention selectively extracts the data by using the identification data and reproduces the selected data.

BRIEF DESCRIPTION OF THE DRAWINGS

FIG. 5 is a table showing the correspondence between the label and data.

FIG. 6 is a diagram showing a data construction of the digital audio signal of the invention;

FIG. 7 is a diagram showing a construction of a reproducing apparatus of digital audio signals of the invention;

DETAILED DESCRIPTION OF THE PREFERRED EMBODIMENT

An embodiment of the invention will be described hereinbelow.

The embodiment includes a recording medium for recording audio signals whose frequency band lies within a range from 0 Hz to 40 kHz, the number of quantization bits is 20 bits, and the audio channels are four channels. The embodiment also includes a recording apparatus and a reproducing apparatus for such a recording medium.

Figure 1:
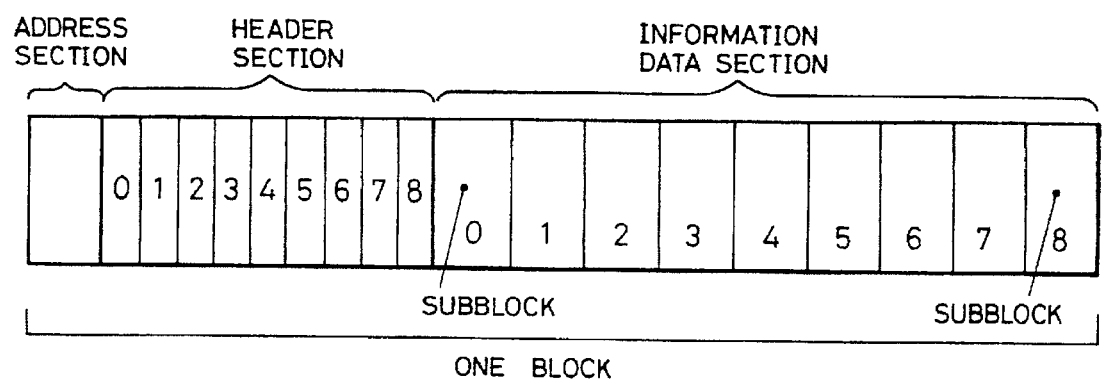
FIG. 1 is a diagram showing a data format of a recording medium according to the present invention.

FIG. 1 shows a data format of one block recorded on the recording medium according to the invention.

One block comprises an address section, a header section, and an information data section. An address indicative of the position of the block is recorded in the address section arranged at a leading position of the block. The information data section in constituted by nine subblocks and the data which has been frequency-band divided for each audio signal channel is stored in each of the subblocks. The header section comprises nine subblock headers. Labels have been recorded in the header section as identification data indicative of the kinds of audio signals channels and frequency bands of the above nine subblocks. For instance, the kind of data recorded in the subblock 0 in FIG. 1 can be, accordingly, discriminated by the label of the identification data recorded in the subblock header 0. The kind of data recorded in the subblock 8 can be discriminated by the label of the identification data recorded in the subblock header 8.

In the recording medium, one block with such a construction repetitively exists along the track in accordance with the order of addresses. A sync signal (not shown in FIG. 1) is inserted between the continuous blocks.

Figure 2:
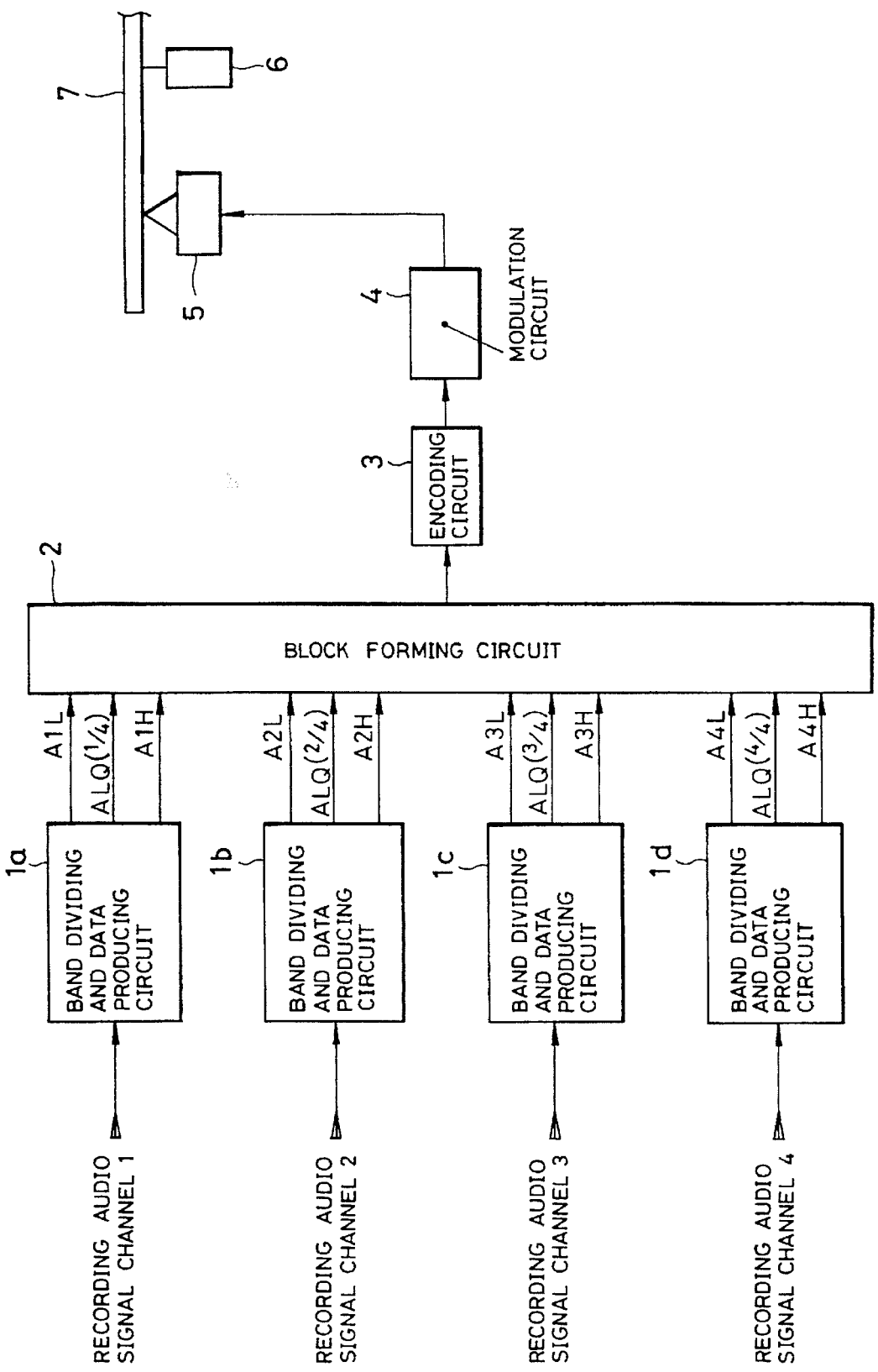
FIG. 2 is a diagram showing the construction of a digital audio signal recording apparatus according to the invention.

FIG. 2 is a diagram showing a construction of the recording apparatus of digital audio signals according to the invention.

Figure 3:
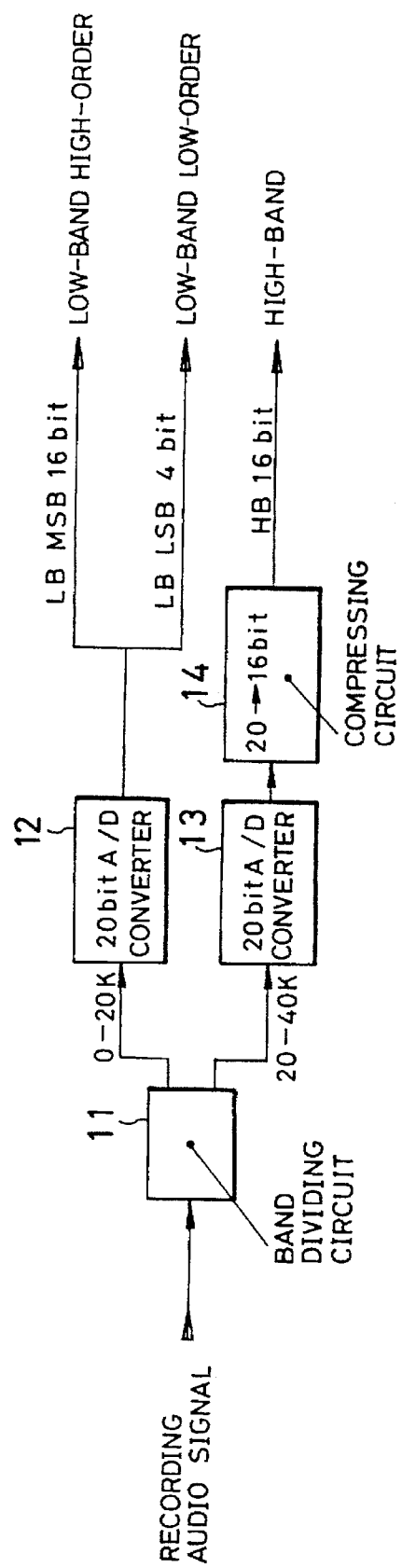
FIG. 3 is a diagram showing the construction of a band dividing and data producing means block.

The recording audio signals of the channels 1 to 4 are supplied to band dividing and data producing circuit 1a to 1d. Each of the band dividing and data producing circuit 1a to 1d has the same internal construction as shown in FIG. 3. In FIG. 3, band dividing circuit 11 performs band-division of the recording audio signals in the form of analog signals into the audio signal component of 0 Hz to 20 kHz and the audio signal component of 20 kHz to 40 kHz and supplies them to 20-bit A/D converters 12 and 13, respectively. The 20-bit A/D converter 12 performs a 20-bit quantization for a audio signal component of 0 Hz to 20 kHz and generates the high-order 16 bits among the 20 bits as a low-band high-order signals and generates the low-order four bits as a low-band low-order signal. The 20-bit A/D converter 13 performs the 20-bit quantization for a recording audio signal component of 20 kHz to 40 kHz and supplies the 20-bit quantization signal to 20-16 bit compressing circuit 14. The 20-16 bit compressing circuit 14 compresses the 20-bit quantization signal into 16 bits by a method such as a differential PCM method or the like and generates as a high-band signal. The band dividing circuit 11 is, for instance, an analog band pass filter comprising a capacitor and a resistor element. It is, however, also possible to use a method of performing a band division by a digital signal processing circuit using a DCT (Discrete Cosine Transform). According to the above method, the analog recording audio signals are supplied to the band dividing circuit 11 using the DCT through A/D converters (not shown). In such a case, the 20-bit A/D converters 12 and 13 are unnecessary.

Figure 4:
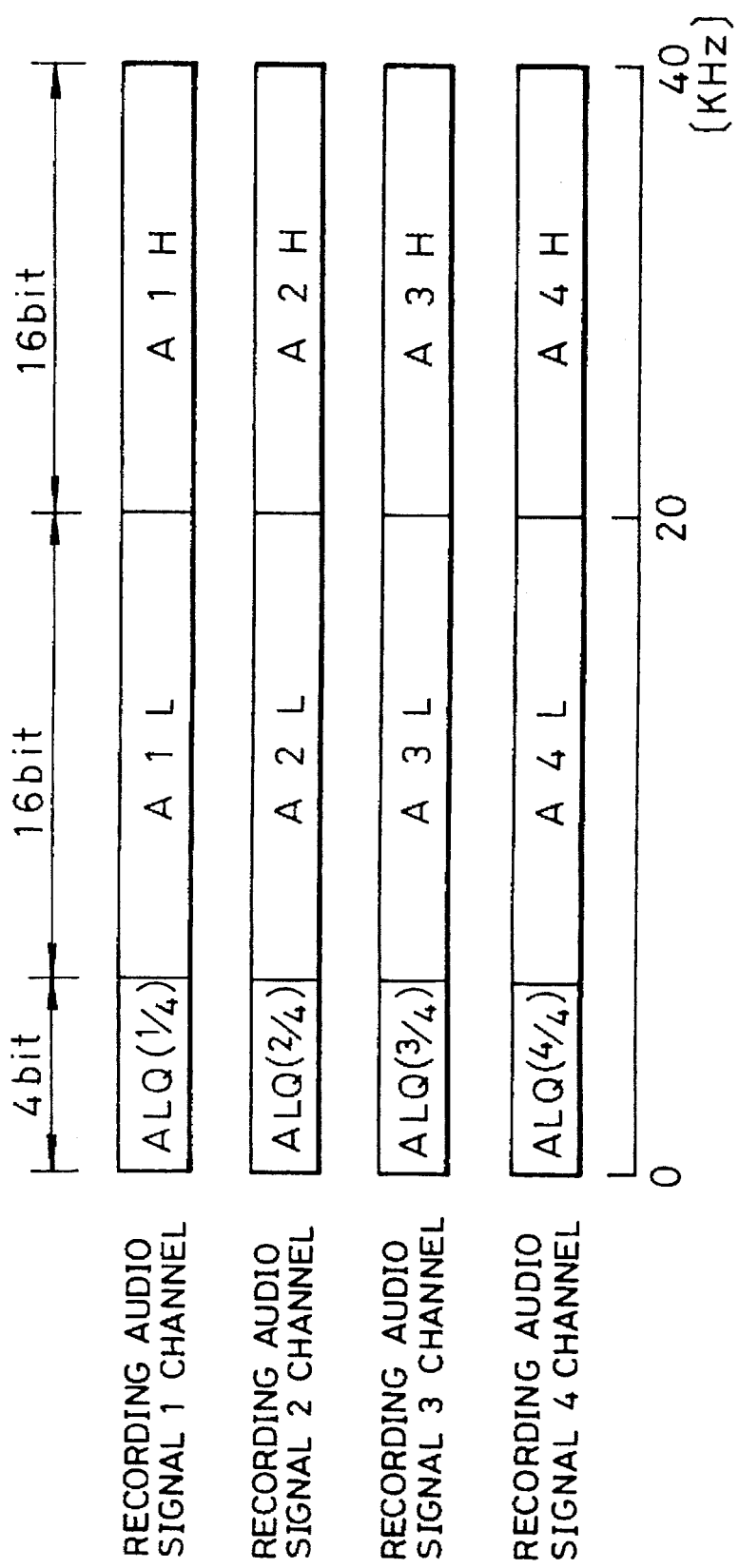
FIG. 4 is a diagram showing band division data names for recording of audio signals according to the invention.

With the above construction, the band dividing and data producing circuit 1a to 1d produce the low-band high-order signals and low-band low-order signals which have been quantized every channel of the recording audio signals and the high-band signals and supply to block forming circuit 2. The output signals of the band dividing and data producing circuit 1a to 1d will now be referred to as denominations shown in FIG. 4 hereinbelow. According to FIG. 4, the low-band high-order signal, low-band low-order signal, and high-band signal which are generated from the band dividing and data producing circuit 1a are set to "A1L", "ALQ (¼)", and "A1H", respectively. The low-band high-order signals, low-band low-order signal, and high-band signal which are generated from the band dividing and data producing circuit 1b are set to "A2L", "ALQ(²⁄₄)", and "A2H", respectively. The low-band high-order signal, low-band low-order signal, and high-band signal which are generated from the band dividing and data producing circuit 1c are set to "A3L", "ALQ(¾)", and "A3H", respectively. The low-band high-order signal, low-band low-order signal, and high-band signal which are generated from the band dividing and data producing circuit 1d are set to "A4L", "A4L", "ALQ(⁴⁄₄)", and "A4H", respectively.

The block forming circuit 2 divides those signals on the time base. The signals existing in the same time zone are combined and are assigned to the subblocks 0 to 8 in the information data section in FIG. 1. Further, the block forming circuit 2 forms labels as identification data to indicate the kinds of data recorded in the subblocks 0 to 8, that is, the kinds of audio signal channels and frequency bands and assigns to the subblock headers 0 to 8 in FIG. 1. FIG. 5 shows a correspondence table between the output signals of the band dividing and data producing circuit 1a to 1d which have been recorded in the subblocks 0 to 8 and the labels. According to FIG. 5, for instance, the label "10" corresponds to "A1L" and the label "14" corresponds to "ALQ". In this instance, "ALQ" of the label "14" denotes the combination of "ALQ(¼)", "ALQ(²⁄₄)", "ALQ(¾)", and "ALQ(⁴⁄₄)".

The block forming circuit 2 forms one block by combining the information data section and the header section and forms a signal shown in FIG. 6 by further adding an address indicative of the position of the block to the head of the block and supplies the resultant signal to an encoding circuit 3. The encoding circuit 3 adds an error correction code to an output signal of the block forming circuit 2 and supplies a resultant signal to a modulating circuit 4. The modulating circuit 4 executes, for instance, an EFM (Eight to Fourteen Modulation) process. The modulated signal is supplied to an optical head 5 and is photoelectrically converted into the electric signal and recorded onto an optical disc 7 which is rotated by a spindle motor 6.

In the labels shown in FIG. 5, there are labels which are not disclosed in the above description and these labels are used to provide applications in an apparatus having another system construction which is not described in the embodiment. For instance, the label "00" is used when the data recorded there doesn't have any meaning. In the system which doesn't need all of the data recorded, the label "00" is added to the unnecessary data. The system, accordingly, doesn't need to read out the memory locations at which the unnecessary data has been recorded, so tat a using efficiency can be raised. The label "01" denotes that a control program or the like which is used in the system has been recorded. The labels "02" to "0F" and the labels "19" to "FF" are provided as spare labels. When the kinds of data are expanded or the like, it is possible to cope with such an expansion by using the spare labels.

A reproducing apparatus of digital audio signals in the invention shown in FIG. 7 reproduces a Super CD in which audio signals of the standards in which a frequency band lies within a range from 0 - Hz to 40 kHz and the number of quantization bits is set to 20 bits and the audio channels are set to four channels have been recorded.

An optical pickup 71 reads information from the optical disc 7 and obtains a reproduction signal. The reproduction signal is EFM (Eight to Fourteen Modulation) demodulated by a demodulating circuit 72 and supplied to an error correcting circuit 73. The error correcting circuit 73 corrects errors in an output signal of the demodulating circuit 72 and supplies the error corrected signal to signal extracting circuit 74. In this instance, the signal shown in FIG. 6 is derived as an output signal of the error correcting circuit 72. The signal extracting circuit 74 detects the labels which are equal to "10", "11", "12", "13", "14", "15", "16", "17", and "18" from the subblock header areas of the signal every block and separates and extracts the data of the subblocks corresponding to those labels, namely, "A1L", "A2L", "A3L", "A4L", "A1H", "A2H", "A3H", "A4H", and "ALQ". Subsequently, the signal extracting circuit 74 supplies "A1L" and "A1H" to a band synthesis and reproduction signal producing circuit 75a, "A2L" and "A2H" to band synthesis and reproduction signal producing circuit 75c, "A3L" and "A3H" to band synthesis and reproduction signal producing circuit 75c, and "A4L" and "A4H" to band synthesis and reproduction signal producing circuit 75d, respectively. In this instance, the separated and extracted "ALQ" 16 bits are further separated into "ALQ(¼)", "ALQ(²⁄₄)", "ALQ(¾)", and "ALQ(⁴⁄₄)" each consisting of four bits. "ALQ(¼)" is supplied to the band synthesis and reproduction signal producing circuit 75a, "ALQ(²⁄₄)" is supplied to the band synthesis and reproduction signal producing circuit 75b, "ALQ(¾)" is supplied to the band synthesis and reproduction signal producing circuit 75c, and "ALQ(⁴⁄₄)" is supplied to the band synthesis and reproduction signal producing circuit 75d, respectively.

Figure 8:
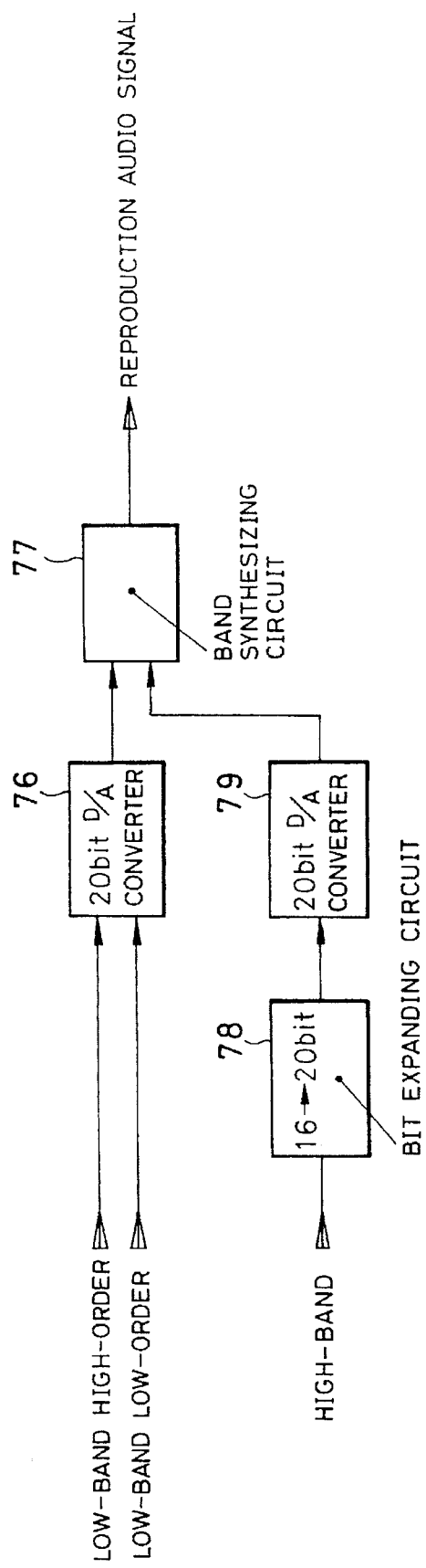
FIG. 8 is a diagram showing the construction of a band synthesis and reproduction signal producing means blocks.

Each of the band synthesis and reproduction signal producing circuit 75a to 75d has the same internal construction as shown in FIG. 8. In FIG. 8, a 20-bit D/A converter 76 receives the 20-bit digital audio signals comprising a combination of the low-band high-order signals (corresponding to "A1L", "A2L", "A3L", and "A4L") as 16-bit digital audio signals and the low-band low-order signals (corresponding to "ALQ(¼)", "ALQ(²⁄₄)", "ALQ(¾)", and "ALQ(⁴⁄₄)") as 4-bit digital audio signals and converts into the analog signal and supplies it to a band synthesizing circuit 77. A 16-20 bit expanding circuit 78 receives the high-band signals (corresponding to "A1H", "A2H", "A3H", and "A4H") as 16-bit digital audio signals compressed by the 20-16 bit compressing circuit 14 and expands to the 20-bit digital audio signals and supplies them to a 20-bit D/A converter 79. The 20-bit D/A converter 79 converts the supplied 20-bit digital audio signals into the analog signal and supplies it to the band synthesizing circuit 77. The band synthesizing circuit 77 band synthesizes the analog signal from the 20-bit D/A converter 76 and the analog signal from the 20-bit D/A converter 79 and generates the resultant synthesis signal as a reproduction audio signal.

The band synthesis reproduction signal producing circuit 75a with the above construction band-synthesizes the signals "A1L", "A1H", and "ALQ(¼)" and generates the resultant synthesis signal as a reproduction audio signal channel 1. The band synthesis and reproduction signal producing circuit 75b band-synthesizes the signals "A2L", "A2H", and "ALQ(²⁄₄)" and generates the resultant synthesis signal as a reproduction audio signal channel 2. The band synthesis and reproduction signal producing circuit 75c band-synthesizes the signals "A3L", "A3H", and "ALQ(¾)" and generates the resultant synthesis signal as a reproduction audio signal channel 3. The band synthesis and reproduction signal producing circuit 75d band-synthesizes the signals "A4L", "A4H", and "ALQ(⁴⁄₄)" and generates the resultant synthesis signal as a reproduction audio signal channel 4.

Figure 9:
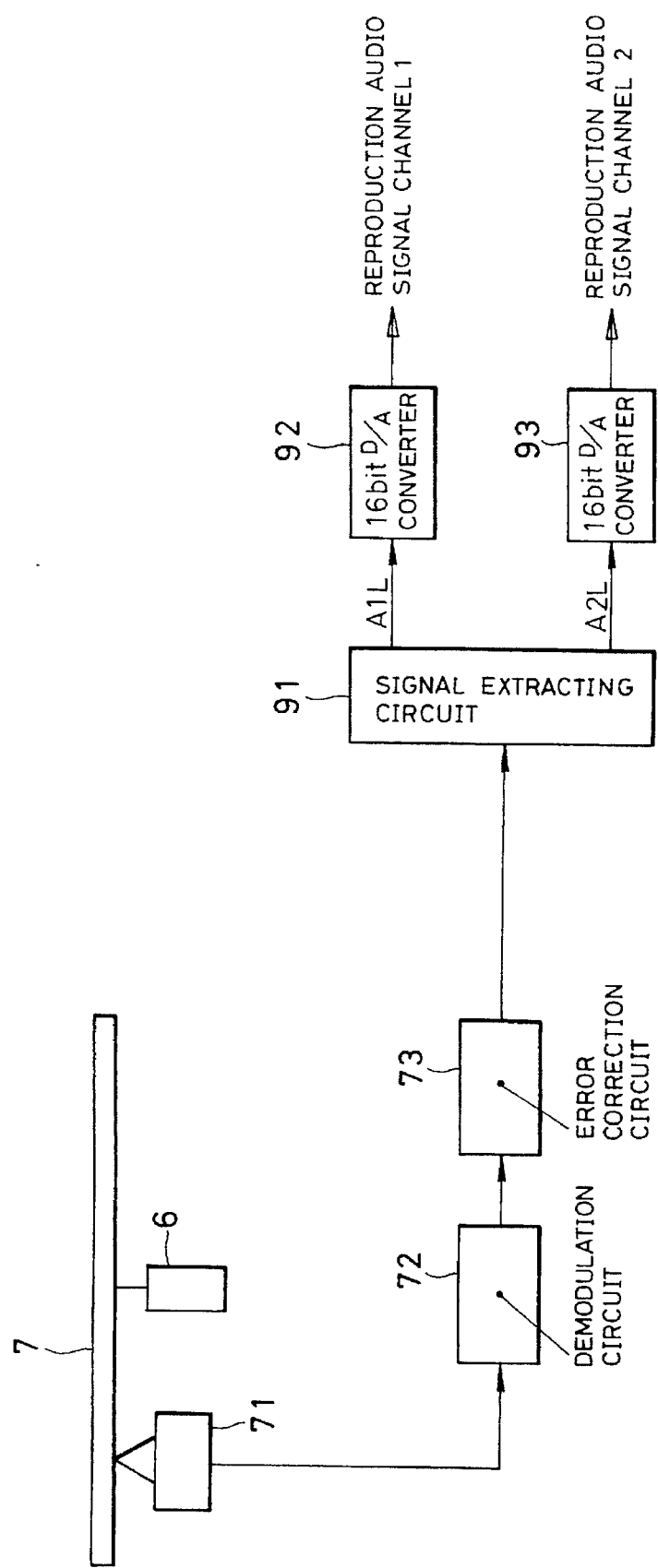
FIG. 9 is a diagram showing a construction of a reproducing apparatus of digital audio signals of the invention.

A reproducing apparatus of digital audio signals according to the invention shown in FIG. 9 reproduces only the recording information of the frequency band lying within a range from 0 Hz to 20 kHz, the number of quantization bits of 16 bits, and the audio channels of two channels from the Super CD in which the audio signals in which the frequency band lies within a range from 0 Hz to 40 kHz and the number of quantization bits is set to 20 bits and the audio channels are set to four channels have been recorded.

The optical pickup 71 reads the information from the optical disc 7 and obtains the reproduction signal. The reproduction signal is EFM (Eight to Fourteen Modulation) demodulated by the demodulating circuit 72 and the demodulated signal is supplied to the error correcting circuit 73. The error correcting circuit 73 corrects errors in the output signal of the demodulating circuit 72 and supplies the error corrected signal to extracting circuit 91. In this instance, an output signal of the error correcting circuit 73 is a signal shown in FIG. 6. The extracting circuit 91 detects the label "10" (label corresponding to "A1L") and the label "11" (label corresponding to "A2L") from the subblock header region of this signal and extracts the data "A1L" and "A2L" of the subblocks corresponding to those labels and supplies the extracted data to 16-bit D/A converters 92 and 93, respectively. The 16-bit D/A converter 92 converts "A2L" as a digital audio signal into the analog signal and generates as a reproduction audio signal channel 1. The 16-bit D/A converter 93 converts "A2L" as a digital audio signal into the analog signal and generates as a reproduction audio signal channel 2.

As described in the foregoing, the recording apparatus of the digital audio signal of the invention is configured to produce data of a plurality of frequency components from the audio signals to be recorded and to record the produced. The recording apparatus, further, adds identification data indicative of the kind of each data and records the resultant data, respectively. The digital audio signal reproducing apparatus of the invention, on the other hand, is configured to selectively extract each of the above data by the identification data and to reproduce the extracted data.

According to the invention, therefore, the reproducing apparatus of the Super CD can be formed as an apparatus of a relatively high price which can reproduce a high quality sound. Conversely, a relatively low price reproducing apparatus can be realized while the quality of the reproduced sound doesn't necessarily satisfy the capability of the Super CD. Thus, it is preferable that the performance of the reproduction apparatus can be selected arbitrarily.

What is claimed is:

1. A method for recording digital audio signals on a recording medium, comprising the steps of:

receiving an original digital audio signal having a plurality of different frequency bands;

converting original digital audio signals into separate channels, each channel containing a different group of band digital data for each frequency band of said original digital audio signals;

dividing each of said band digital data groups in each of said channels along a time base, thereby obtaining a plurality of band subblocks obtained from said original digital audio signals;

combining said ones of said band subblocks existing in a same time zone among said band subblocks, thereby obtaining an information data section composed of a plurality of said combined subblocks;

producing a header section including identification data blocks indicative of each of said frequency bands of each subblock combined and included in said information data section;

combining said subblocks of said information data section and said identification data blocks of said header section, thereby producing a block including a header section and an information data section obtained from said original digital audio signal; and recording said block on said recording medium.

2. A method according to claim 1 wherein said step for converting input digital audio signals includes a step for dividing each of said separate channels of said original digital audio signal into low-band, high order signals, low band, low-order signals, and high band signals for each channel.

3. A digital audio signal reproducing apparatus for reproducing information from a recording medium on which a plurality of channels of original digital audio signals are recorded after being divided into blocks each of which is constituted by an information data section consisting of a plurality of subblocks and a header section obtained from said original digital audio signal which is arranged at a position preceding said information data section and includes a plurality of identification data blocks indicative of at least frequency bands corresponding to respective subblocks, said reproducing apparatus comprising:

reading means for reading a digital signal from said recording medium; and extracting means for obtaining identification data in said header section for each block from said digital signal which is generated from said reading means and for extracting the digital audio signals on a subblock unit basis in accordance with said identification data when said identification data is equal to predetermined identification data, thereby obtaining a reproduction digital audio signal.

4. A digital audio signal reproducing apparatus for reproducing information of a recording medium on which a plurality of channels of original digital audio signals are recorded after being divided into blocks each of which is constituted by an information data section consisting of a plurality of subblocks and a header section which is arranged at a position preceding said information data section and which includes a plurality of identification data blocks indicative of at least each of said frequency bands corresponding to respective subblocks, said reproducing apparatus comprising:

reading means for reading a digital signal from said recording medium;

extracting means for obtaining identification data in said header section for each block from said digital signal which is generated by said reading means and for extracting the digital audio signals on a subblock unit basis in accordance with said identification data when said identification data is identical with predetermined identification data; and a plurality of channels including band synthesizing means connected to said extracting means for performing a band-synthesizing operation for selected ones of said plurality of digital audio signals among digital audio signals extracted by said extracting means, thereby obtaining reproduction digital audio signals in each of said channels.

\* \* \* \* \*

UNITED STATES PATENT AND TRADEMARK OFFICE
CERTIFICATE OF CORRECTION

PATENT NO. : 5,648,948

DATED : July 15, 1997

INVENTOR(S) : Itoh et al.

It is certified that error appears in the above-identified patent and that said Letters Patent is hereby corrected as shown below:

On the title page, item [73] Assignee: change the first named " Pioneer Electronic Corporation, Yamanashi ; to  --  Pioneer Video Corporation Yamanashi ; --.

Signed and Sealed this

Thirteenth Day of January, 1998

Attest:

BRUCE LEHMAN

*Attesting Officer*                *Commissioner of Patents and Trademarks*